United States Patent [19]
Hamburg

[11] Patent Number: 6,028,583
[45] Date of Patent: Feb. 22, 2000

[54] COMPOUND LAYERS FOR COMPOSITED IMAGE MANIPULATION

[75] Inventor: Mark Hamburg, Scotts Valley, Calif.

[73] Assignee: Adobe Systems, Inc., San Jose, Calif.

[21] Appl. No.: 09/007,988

[22] Filed: Jan. 16, 1998

[51] Int. Cl.[7] .................................................. H04N 5/262
[52] U.S. Cl. ...................... 345/112; 345/113; 345/114; 345/115; 348/584; 348/586
[58] Field of Search ..................................... 345/112, 113, 345/114, 115; 348/584, 586, 598

[56] References Cited

U.S. PATENT DOCUMENTS

| | | | |
|---|---|---|---|
| 4,924,299 | 5/1990 | Mizuno et al. | 345/113 |
| 5,315,390 | 5/1994 | Windrem | 348/584 |
| 5,874,967 | 2/1999 | West et al. | 345/113 |
| 5,892,521 | 4/1999 | Blossom et al. | 345/113 |
| 5,937,104 | 8/1999 | Henderson et al. | 348/586 |

FOREIGN PATENT DOCUMENTS 0 564 247 A1   6/1993   European Pat. Off. .

OTHER PUBLICATIONS

Adobe, Adobe After Effects User Guide, pp. 137–191, 323–342, Oct. 1995.

*Primary Examiner*—Bipin Shalwala
*Assistant Examiner*—Vincent E. Kovalick
*Attorney, Agent, or Firm*—Fish & Richardson P.C.

[57] ABSTRACT

A method of compositing a set of ordered image layers in which a compound layer contains a plurality of image layers. The compound layer has a compound layer effect. Any image layers under the compound layer are composited to generate a first intermediate image, the first intermediate image is composited with each image layer in the compound layer to generate a second intermediate image, the first intermediate image is composited with the second intermediate image according to the compound layer effect to generate a third intermediate image, and the third intermediate image is composited with any remaining image layers to generate a final image.

18 Claims, 6 Drawing Sheets

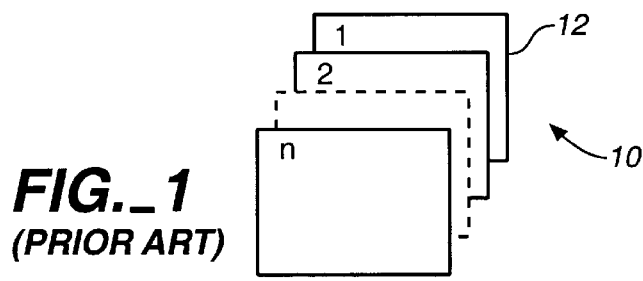
FIG._1
*(PRIOR ART)*
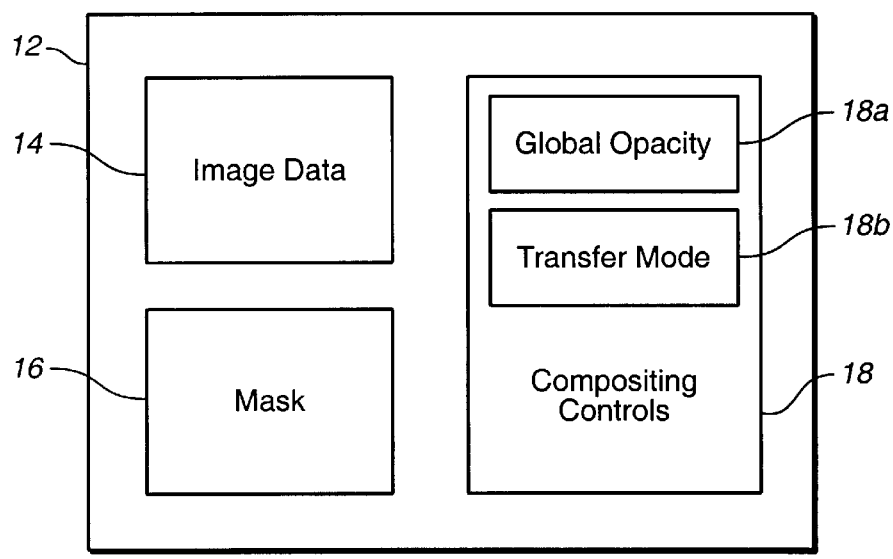
FIG._2
*(PRIOR ART)*
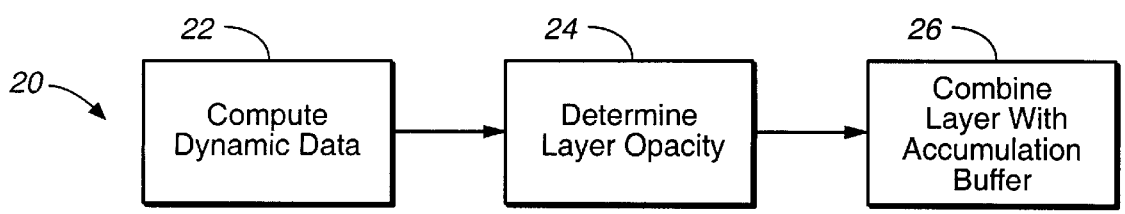
FIG._3
*(PRIOR ART)*

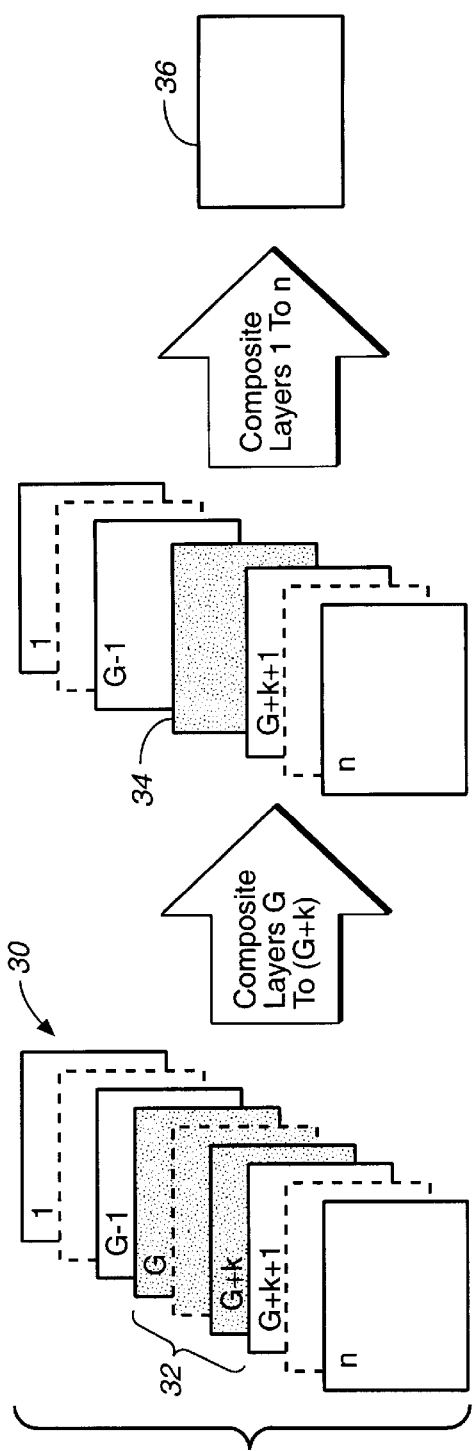
FIG._4 *(PRIOR ART)*
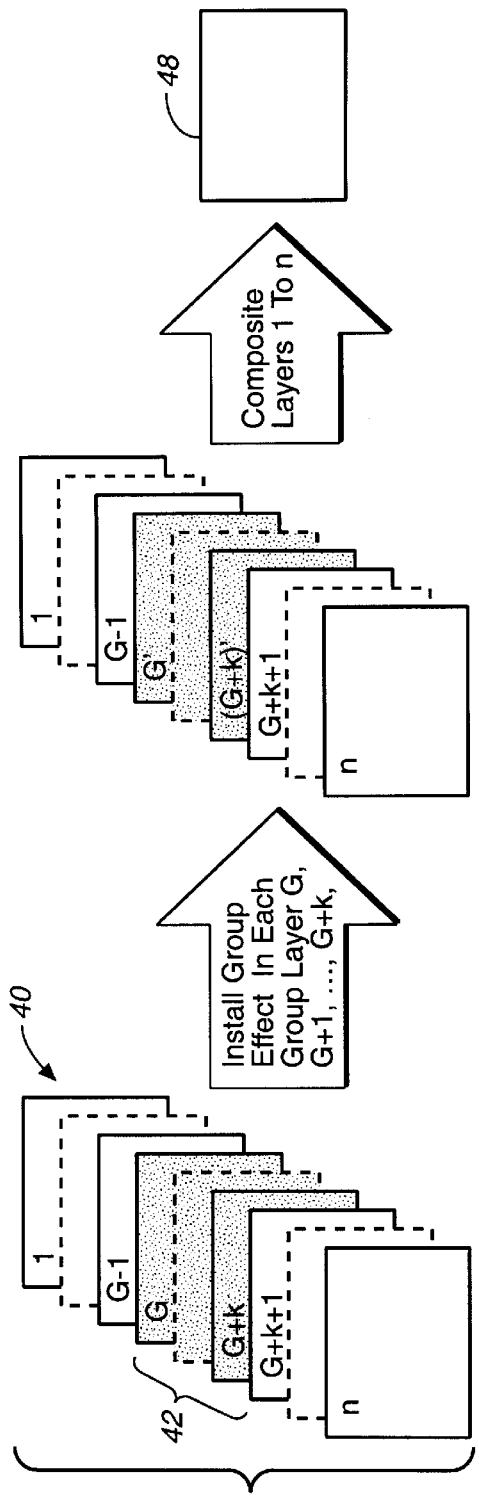
FIG._5 *(PRIOR ART)*

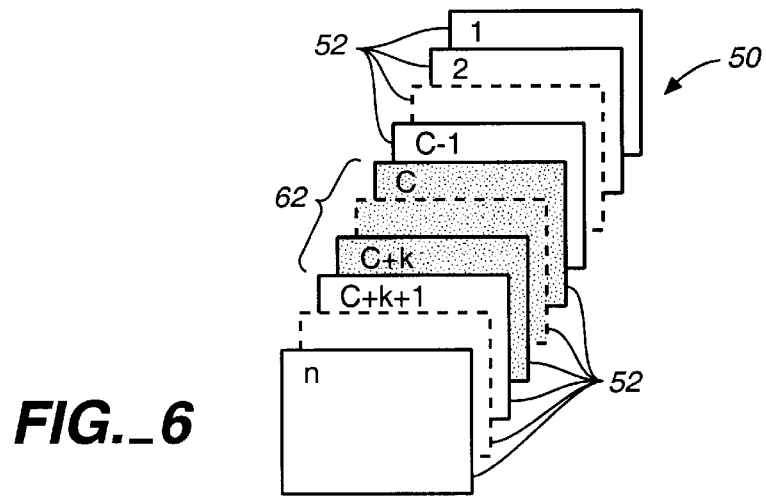
FIG._6
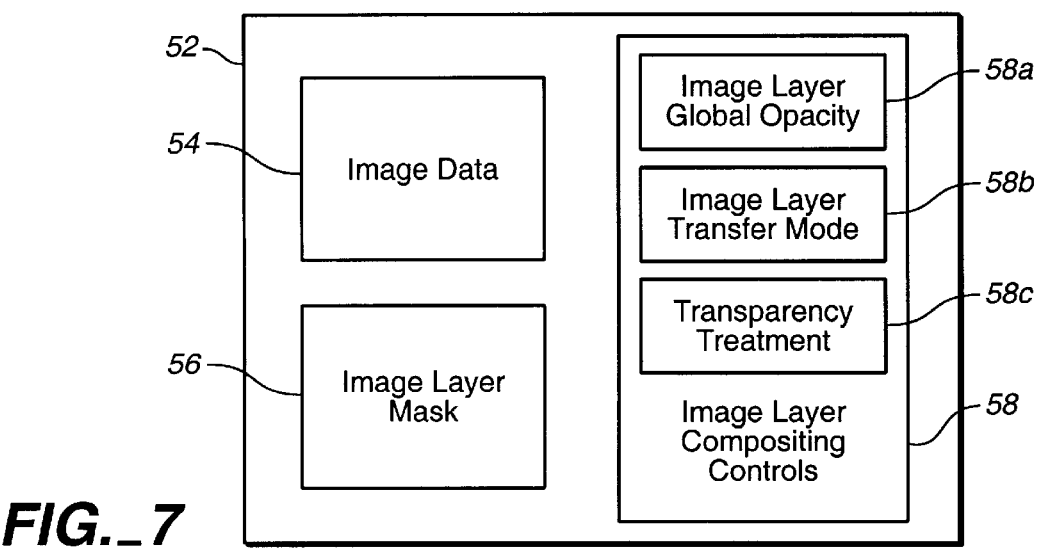
FIG._7
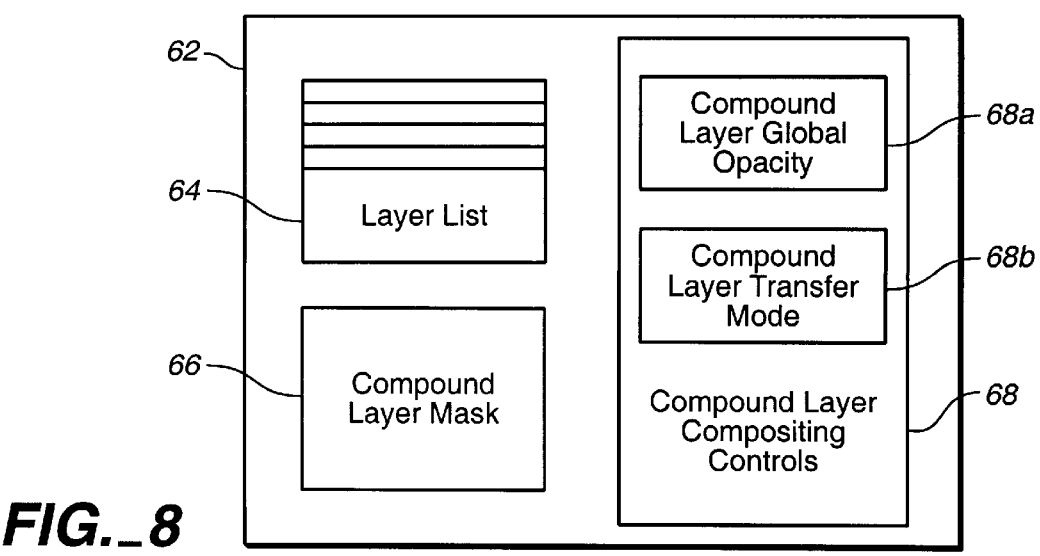
FIG._8

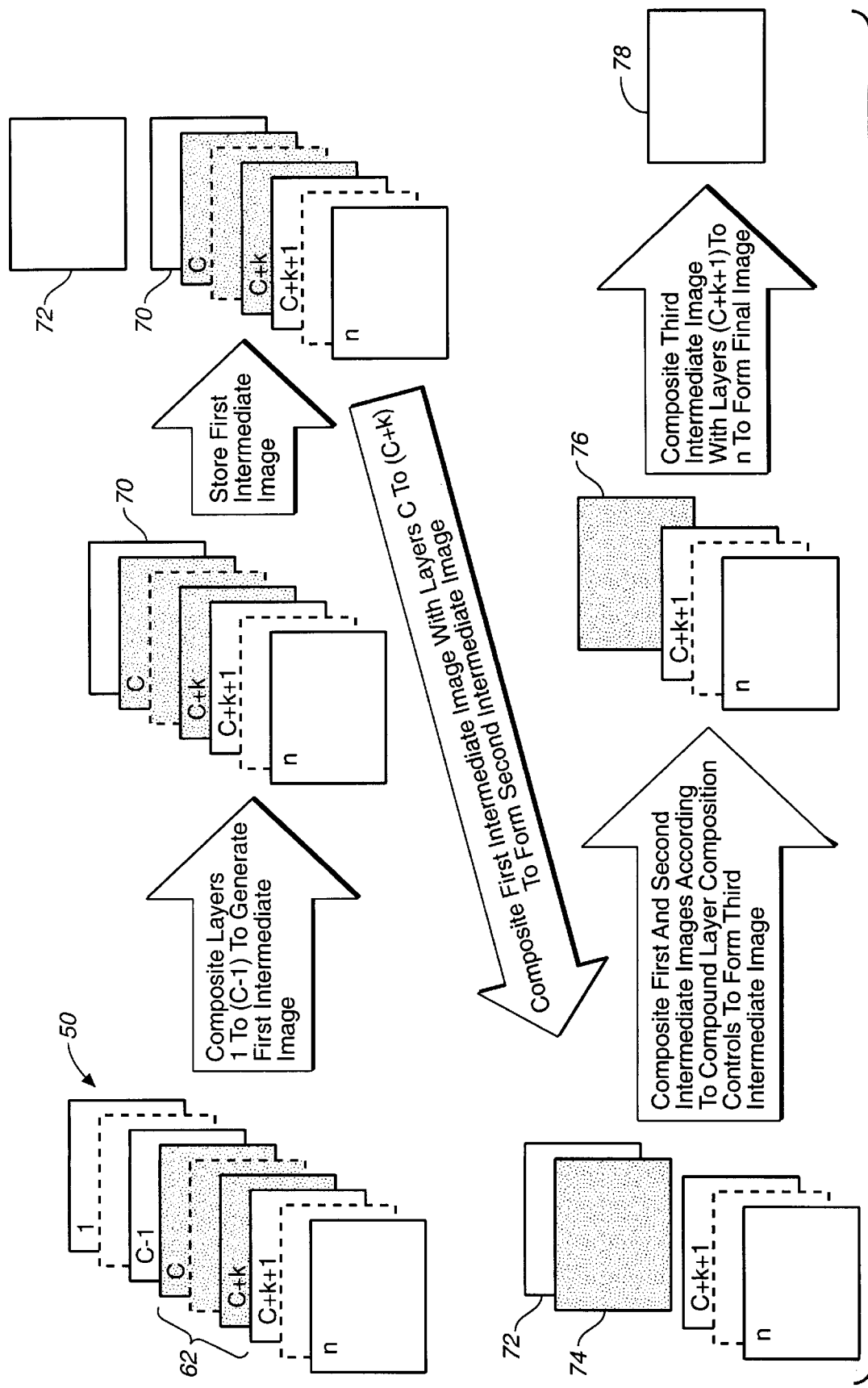
FIG._9

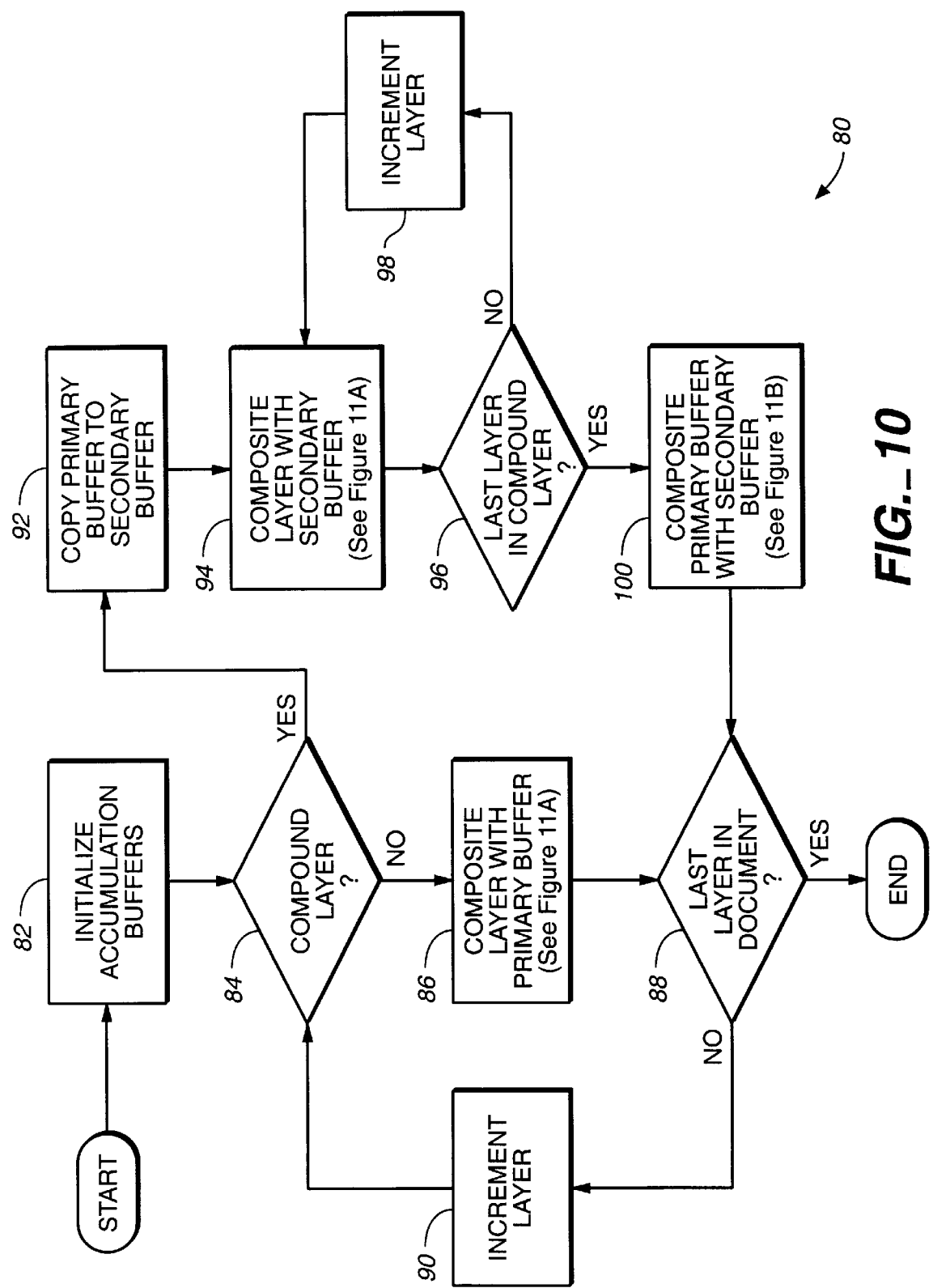
FIG._10

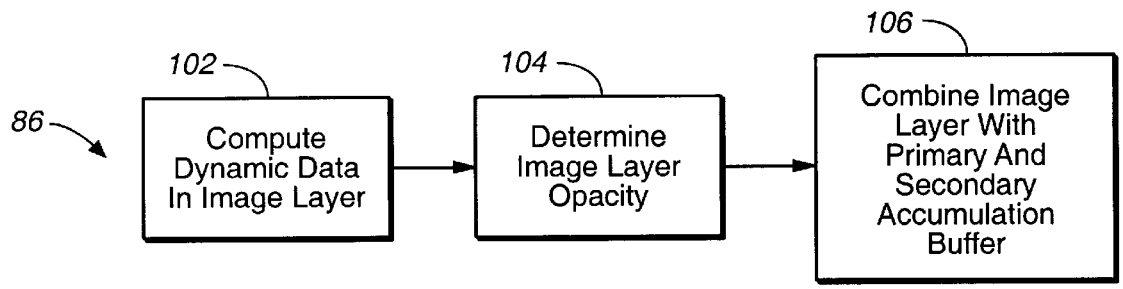
FIG._11A
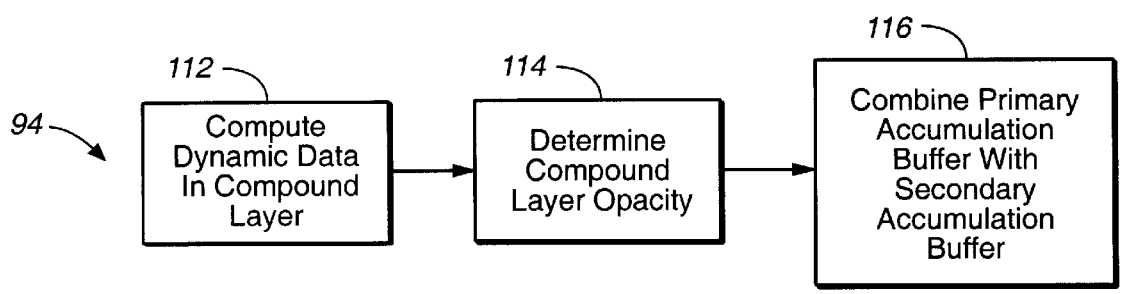
FIG._11B
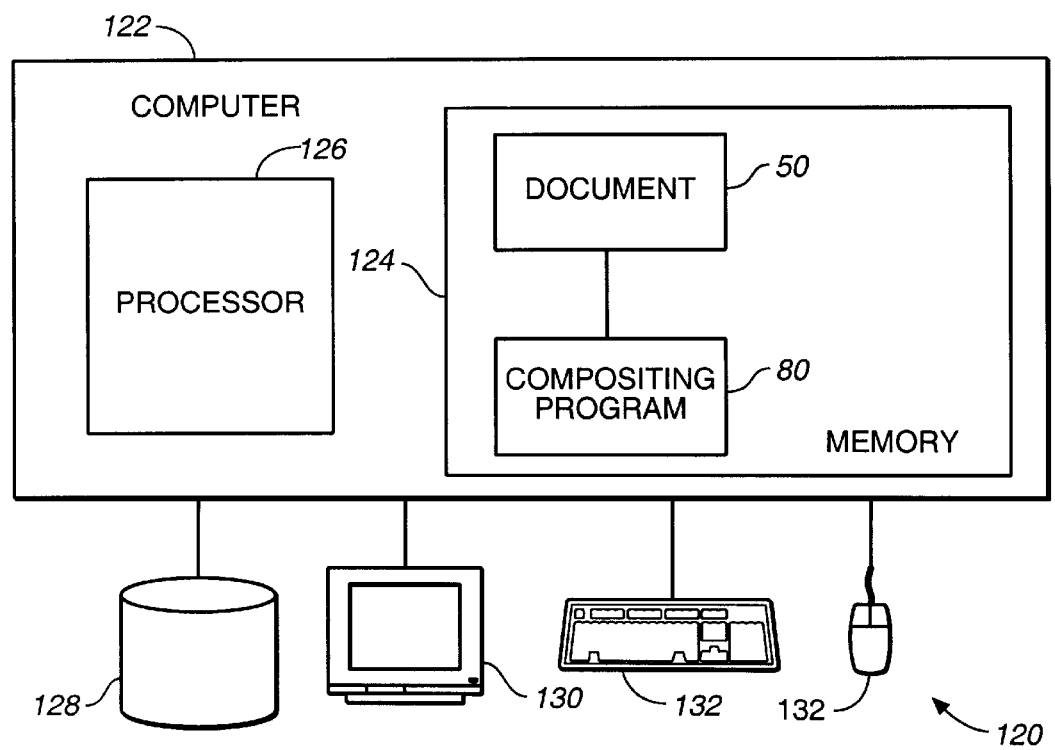
FIG._12

COMPOUND LAYERS FOR COMPOSITED IMAGE MANIPULATION

BACKGROUND

The present invention is generally related to graphical image manipulation systems, and more particularly to a method for compositing multiple graphical images.

A graphical image manipulation computer program, such as Adobe Photoshop 4.0, from Adobe Systems Incorporated, of San Jose, Calif., may store a graphical image as a set of image layers. Such a program builds a final image by compositing the image layers together. The image layers may be thought of as stacked sheets of acetate. The density of the ink on the acetate controls the transparency of the sheet, i.e., the extent to which the sheet obscures the underlying sheets. In the computer program, the color and density of the ink on the acetate sheet are represented by a color value and an opacity (or "alpha") value, respectively.

Referring to FIG. 1, a conventional graphical image document 10 includes a set of image layers 12, denoted as layers 1, 2, ..., n, organized in a layer stack. The bottom layer, i.e., layer 1, acts as the background or bottom sheet, whereas the other layers, i.e., layers 2, 3, ..., n, act as the transparencies which are overlaid on the background.

Referring to FIG. 2, each image layer 12 typically includes an image 14, an optional mask or masks 16, and compositing controls 18. Typically, the image 14 is represented by an array of pixels, with each pixel having a color and, optionally, an opacity. Similarly, the mask 16 is typically represented by an array of pixels, with each pixel having an opacity. However, the image 14 and the mask 16 could be defined analytically, e.g., by using shape outlines, or by other functions which define color and/or opacity as a function of position. In addition, the image 14 and the mask 16 can be dynamic, i.e., computed at the time the layers are composited from the results of compositing the underlying layers or other data. For example, one layer in the document could be a filter or an adjustment layer in which the data representing the image is determined from the data in an underlying image layer.

The compositing controls 18 may include a global opacity 18a and a transfer mode 18b. The global opacity 18a controls, in essence, the transparency of the entire image layer 12, whereas the transfer mode determines how the colors in the image layer 12 mix with the colors accumulated from the underlying layers. The compositing controls may also be considered to include dynamic masks.

The process of stacking the acetate sheets to form the final image is modeled by an accumulation buffer which stores a composited color for each pixel. The image layers are composited in order from bottom to top. Referring to FIG. 3, a conventional process 20 for compositing an image layer begins by calculating any dynamic data in the image layer, such as the color of the pixels in the image or the opacity of the pixels in the mask (step 22). Then the opacity of each pixel is determined from the mask 16, the global opacity 18a, and, if appropriate, the image 14 (step 24). Finally, the color of each pixel in the image layer is combined with the composited color of the corresponding pixel in the accumulation buffer to generate a new composited color (step 26). The combination is controlled by the opacity of the layer pixel and the transfer mode 18b. This process is iterated for each layer until all the layers have been composited, thus generating the final image.

There are a variety of situations in which a user may wish to group individual layers together and work with the group as a single entity. For example, the user may wish to apply an effect to a group of layers to generate the visual appearance that the group is actually a single layer. Alternately, the grouping may be required by the graphical image manipulation program which generated the layers. Unfortunately, conventional graphical image manipulation programs have been unable to apply opacity and transfer mode effects to groups of layers properly. In addition, conventional programs generate image defects when dynamic images or dynamic masks are included in layer groups.

Referring to FIG. 4, one conventional method of compositing the layers 1, 2, ..., n, of a layer stack 30 is termed "reassociation". In this method, the constituent image layers G, G+1, ..., G+k of a layer group 32 are separately composited to form an intermediate layer 34. Then the intermediate layer 34 is composited as an image layer in the layer stack 30 to form a final image 36. However, if any image layer in the group 32 contains dynamic data which depends on an underlying image layer, i.e., layers 1, 2, ..., G−1, the compositing process will not generate the intended result because the underlying data is unavailable. In addition, the compositing controls associated with the individual image layers G, G+1, G+k in the group 32 do not interact with the data from the underlying image layers 1, 2, ..., G−1. Thus, many opacity and transfer mode effects will not generate the intended result.

Referring to FIG. 5, another conventional method of compositing a layer stack 40 is termed "distribution". In this method, the group compositing effect is installed in each image layer G, G+1, ..., G+k, in the group 42 to generate modified layers G', (G+1)', ..., (G+k)'. Then the image layers 1, 2, ..., n are composited to generate a final image 44. Unfortunately, this technique does not permit individual image layers to have a transfer mode which differs from the transfer mode of the group. Furthermore, if an effect changes the opacity of the images the group of layers, previously obscured elements in the group may become visible.

SUMMARY

In one aspect, the invention is directed to a method of compositing a set of ordered image layers. In the method, a compound layer is defined containing a plurality of image layers from the set of image layers. The compound layer has a compound layer effect. Any image layers under the compound layer are composited to generate a first intermediate image, the first intermediate image is composited with each image layer in the compound layer to generate a second intermediate image, the first intermediate image is composited with the second intermediate image according to the compound layer effect to generate a third intermediate image, and the third intermediate image is composited with any remaining image layers to generate a final image.

Implementations of the invention may include the following. The compound layer effect may comprise positionally varying opacity information or dynamic data, and may be represented by a pixel array or analytically. The compound layer effect may comprise a global opacity or a color blending effect, particularly if the color blending effect satisfies the property that $T(c,c)=c$, where $T$ represents the transfer function of the color blending effect and $c$ represents a color. Compositing the stored first intermediate image with the second intermediate image may comprise calculating any dynamic data in the composite layer, calculating an opacity of the composite layer, and combining a color in the stored first intermediate image with a color in the second intermediate image to generate a composited color in the third intermediate image, and combining an opacity in the first intermediate image with an opacity in the second intermediate image to generate a composited opacity in the third intermediate image. The compound layer may have a first compound layer containing the plurality of image layers and a second compound layer containing a subset of the plurality of image layers. The second compound layer may include a second compound layer effect. Compositing the first intermediate image with each image layer in the first compound layer may comprise compositing any image layers in the first compound layer under the second compound layer to generate a fourth intermediate image, compositing the fourth intermediate image with each image layer in the second compound layer to generate a fifth intermediate image, compositing the fourth intermediate image with the fifth intermediate image according to the second compound layer effect to generate a sixth intermediate image, and compositing the sixth intermediate image with any remaining image layers in the first compound layer to generate the second intermediate image. The first intermediate image may be stored to be combined with the second intermediate image.

Among the advantages of the invention are one or more of the following. Dynamic images and masks may be included in a compound layer. Various effects, such as global opacity, transfer modes, and masks having intermediate opacity values, may be applied to the compound layer. Compound layers may be nested within other compound layers.

Other advantages will become apparent from the following description, including the drawings and claims.

BRIEF DESCRIPTION OF THE DRAWINGS

FIG. 1 is a block diagram of a prior art graphical image document containing multiple image layers.

FIG. 2 is a block diagram of an image layer from FIG. 1.

FIG. 3 is a flow chart illustrating a prior art method of compositing a layer.

FIG. 4 is a block diagram illustrating the prior art "reassociation" method of compositing a document containing a layer group.

FIG. 5 is a block diagram illustrating the prior art "distribution" method of compositing a document containing a layer group.

FIG. 6 is a block diagram of a graphical image document containing a compound layer, in accordance with the present invention.

FIG. 7 is a block diagram of an image layer.

FIG. 8 is a block diagram of a compound layer.

FIG. 9 is a block diagram illustrating a method of compositing a graphical image document containing a compound layer, in accordance with the present invention.

FIG. 10 is a flow chart illustrating a method of compositing a graphical image document containing a compound layer, in accordance with the present invention.

FIGS. 11A and 11B are flow charts illustrating compositing steps from FIG. 10.

FIG. 12 is a block diagram of a computer system that may be used to implement the invention.

DETAILED DESCRIPTION

Referring to FIG. 6, a graphical image document 50 includes multiple image layers 52, denoted as layers 1, 2, . . . , n, organized in a layer stack. At least two image layers in the document 50 form a compound layer 62. For example, if the compound layer 62 includes (k+1) image layers, then layers C, C+1, . . . , C+k may be included in the compound layer 62. The compound layer 62 is an image compositing construct which permits layer properties, such as partially opaque masks and compositing controls, to be applied to a group of adjacent image layers.

Referring to FIG. 7, each image layer 52 includes an image *, 54, an optional image layer mask or masks 56, and image layer compositing controls 58, such as a global opacity 58a, a color blending effect, such as a transfer mode 58b, and a transparency treatment 58c. The image 54 provides color information and, optionally, opacity information, as a function of position. Similarly, the mask or masks 56 provide opacity information as a function of position. Thus, the image 54 and the mask 56 may be represented analytically or by pixels, and may include image objects, graphical objects, text objects, and the like. The transparency treatment is to the opacity information as the transfer mode is to the color information, i.e., it determines a new opacity from the opacity of the individual image layer 52 and the opacity of the composited underlying layers.

Referring to FIG. 8, the compound layer 62 includes a layer list 64 identifying the image layers, i.e., layers C, C+1, . . . , C+k, that form the compound layer 62. The compound layer 62 also includes an optional compound layer mask or masks 66, and compound layer composition controls 68. The compound layer mask or masks 66 provide opacity information as a function of position, and may be represented analytically or by pixels. The compound layer composition controls 68 may specify a global opacity 68a and a color blending effect, such as a transfer mode 68b, for the compound layer 62.

Referring to FIG. 9, a method of compositing a document 50 containing a compound layer 62 is illustrated schematically. Initially, the image layers underlying the compound layer, i.e., layers 1, 2, . . . , C−1, are composited normally to generate a first intermediate image 70. The first intermediate image 70 is stored, e.g., in a volatile or non-volatile memory, to provide a stored intermediate image 72. Then the image layers in the compound layer 62, i.e., layers C, C+1, . . . , C+k, are composited with the first intermediate image 70 to generate a second intermediate image 74. The stored intermediate image 72 and the second intermediate image 74 are composited together according to the mask 66 and the compound layer composition controls 68 to generate a third intermediate image 76. Finally, the third intermediate image 76 is composited with the remaining image layers, i.e., C+k+1, C+k+2, . . . , n, to generate a final image 78.

Referring to FIG. 10, a graphical image manipulation program may execute a method 80 of compositing the image layers.

The program begins by initializing a set of accumulation buffers to an empty or blank state, e.g., a single color for each pixel (step 82). The set of accumulation buffers includes at least a primary accumulation buffer and a secondary accumulation buffer. The accumulation buffers will store a composited color value for each pixel, and may also store a composited alpha value for each pixel.

The image layers are composited in order from bottom to top. Specifically, beginning with the bottom layer, the system determines whether the current image layer is part of a compound layer (step 84). If the image layer is a normal layer, it is composited in a conventional fashion into the primary accumulation buffer (step 86).

Referring to FIG. 11A, the process for compositing an image layer into the primary accumulation buffer begins by calculating any dynamic data in the image layer (step 102). Then the opacity of each pixel in the image is determined from the image layer mask, the global opacity of the image layer, and, if appropriate, the opacity data in the image (step 104). The opacity of each pixel in the layer, layer_alpha, may be computed as follows:

layer_alpha(x, y)=global_alpha*mask_alpha(x, y)*image_alpha(x, y)

where image_alpha represents the opacity of each pixel in the image, mask_alpha represents the opacity of each pixel in the image layer mask, and global_alpha is the global opacity of the image layer. If the image layer includes multiple masks, the masks may be multiplied together to generate mask_alpha.

Once the opacity data has been calculated, the data representing the image is combined with the data in the primary accumulation buffer using a function determined by the image layer transfer mode (step 106). The color of each pixel in the image layer is combined in with the color of the corresponding pixel in the accumulation buffer to generate a new composited color. This combination is controlled by the opacity of the layer pixel, layer_alpha, and the image layer transfer mode.

Individual images which lack compositing controls may considered to be image layers by applying a default transfer mode and default opacity.

In the simplest case, where the accumulation buffers do not store alpha values for the pixels, and the image layer transfer mode is a normal blending mode, the program calculates the new color, new_primary_color, for each pixel in the accumulation buffer according to the following function:

new_primary_color(x, y)=lerp_color(old_primary_color(x, y), layer-color(x, y), layer_alpha(x, y))

where old_primary_color represents the pixel colors previously stored by the accumulation buffer, layer_color represents the colors of the pixels in the image layer being composited, and layer_alpha represents the opacity of the pixels as calculated in step 104.

The lerp function is a linear interpolation function, i.e., for arbitrary variables u, v, and a, lerp (u,
v,
a)=u*(1−a)+v*a The lerp_color function performs this interpolation for each color channel in the image. In this implementation, an alpha value of 0.0 represents totally transparent, whereas an alpha value of 1.0 represents fully opaque.

If the image layer being composited has a transfer mode other than the normal blending mode, then the color of each pixel in the accumulation buffer may be calculated as follows:

blended_color(x, y)=transfer-mode(oldprimary_color(x, y), layer_color(x, y))

new_primary_color(x, y)lerp_color(old_primary_color(x, y), blended_color(x, y), layer_alpha(x, y))

where transfer_mode is a function which is determined by the image layer transfer mode. For example, the image layer transfer mode may implement a blending mode such as multiply, screen overlay, hard light, soft light, exclusion, color dodge, color burn, darken, lighten, difference, hue, saturation, color, or luminosity.

In the case where the accumulation buffers store the alpha value for each pixel, a more complicated computation is performed to determine the new color and new opacity for each pixel in the accumulation buffer. These calculations may be performed as follows:

new_primary_alpha(x, y)lerp(old_primary_alpha(x, y), 1.0, layer_alpha(x, y))

temporary(x, y)=layer_alpha(x, y)/new_primary_alpha(x, y)

new_primary_color(x, y)=lerp_color(old_primary_color(x, y), layer_color(x, y), temporary(x, y))

Other modifications to the alpha values in the accumulation buffer are possible, depending on the transparency treatment for the image layer. For example, the image layer composition controls may be set to leave the alpha values in the accumulation buffer unchanged.

In the case where the accumulation buffers store the alpha value and the image layer has a transfer mode other than the normal blending mode, the exact treatment will depend on the nature of the transfer mode. However, for transfer modes that satisfy the property that when a color is combined with itself, the transfer mode generates the same color as output, i.e., T(c,c)=c, the following calculations may be performed:

new_primary_alpha(x, y)=lerp(old_primary_alpha(x, y), 1.0, layer_alpha(x, y))

temporary_alpha(x, y)=old_primary_alpha(x, y)/new_primary_alpha(x, y)

temporary_color(x, y)=lerp_color(layer color(x, y), old_primary_color(x, y), temporary_alpha(x, y))

blended_color(x, y)=transfer_mode(temporary_color(x, y), layer_color(x, y))

new_primary_color(x, y)=lerp_color(temporary_color(x, y), Blended_color(x, y), layer_alpha (x, y))

Returning to FIG. 10, once the image layer has been composited with the primary accumulation buffer, the program determines whether the last image layer in the document has been composited (step 88). Assuming that more image layers remain to be composited, the program increments a layer counter to proceed to the next image layer in the stack (step 90), and the method returns to step 84. Thus, the program composites image layers into the primary accumulation buffer until the compound layer has been reached.

If the program determines in step 84 that the image layer is 9 part of a compound layer, the primary accumulation buffer is copied into a secondary accumulation buffer (step 92). The copy action may be represented as follows:

secondary_color(x, y)=primary_color(x, y)

secondary_alpha(x, y)=primary_alpha(x, y).

At this point, both the primary accumulation buffer and the secondary accumulation buffer contain a composited image consisting of the image layers below the compound layer, i.e, layers 1, 2, . . . , C−1.

The system composites the layer of the compound layer into the secondary accumulation buffer (step 94). In step 94, any dynamic data is calculated, the opacity of each pixel is determined, and the data representing the image for the image layer is combined with the data in the secondary accumulation buffer according to the image layer transfer mode in the layer compositing controls. Thus, the process of compositing layers into the secondary buffer is the same as the process of steps 102–106, except that the secondary buffer is used in place of the primary buffer, i.e., the variables secondary_color and secondary_alpha may be substituted for the variables primary_color and primary_alpha in the functions described above.

After compositing the each layer into the secondary accumulation buffer, the system determines whether that layer was the last image layer in the compound layer (step 96). If more layers remain in the compound layer, the system increments the layer counter to advance to the next image layer (step 98), and then returns to step 94. Thus, the system continues compositing layers into the secondary accumulation buffer until the system determines that the top layer of the compound layer, i.e., layer C+k, has been composited. At this point, the secondary accumulation buffer contains a composited image of layers 1, 2, ..., C+k.

Once the second accumulation buffer has been composited with the image layers in the compound layer, the secondary accumulation buffer is composited into the primary accumulation buffer (step 100). The first and second accumulation buffers are combined using the compound layer mask and the compound layer composition controls, including the global opacity and the transfer mode.

Referring to FIG. 11B, any dynamic data in the compound layer mask is calculated (step 112). Then the opacity for each pixel of the compound layer is determined (step 114). The opacity, compound-alpha, may be calculated as follows:

compound_alpha(x, y)=compound_global_alpha*compound_mask_alpha(x, y)

where compound_global_alpha is the global opacity and compound_mask_alpha represents the opacity of each pixel in the compound layer mask.

Then the color of each pixel in the first accumulation buffer is combined with the color of each pixel in the secondary accumulation buffer to generate a new composite color (step 116). This combination is controlled by the compound layer transfer mode. Assuming that the accumulation buffers do not store opacity values, the new value of the primary accumulation buffer, new_primary_color, may be calculated as follows:

new_primary_color(x, y)=lerp_color(old_primary_color(x, y), secondary_color(x, y), compound_alpha(x, y))

where compound_alpha represents the combined opacity of the compound layer mask or masks and the global opacity of the compound layer, secondary_color represents the composited color of the pixels in the secondary accumulation buffer, and old_primary_color represents the previous color of the pixels in the primary accumulation buffer.

Where the compound layer composition controls 68 include a transfer mode, and the accumulation buffer does not include an alpha component, the new value for the pixels, new_primary_color may be calculated as follows:

blended_color(x, y)=compound_transfer_mode(old_primary_color(x, y), secondary_color(x, y))

new_primary_color(x, y)=lerp_color(old_primary_color(x, y), blended_color(x, y), compound_alpha_(x, y)).

where compound_transfer_mode is a function determined by the compound layer transfer mode.

Unfortunately, this procedure operates properly only for transfer modes that satisfy the property that when a color is combined with itself, the transfer mode generates the same color as output, i.e., T(c,c)=c. An examples of such a transfer mode is include the normal mode function T(u,v)=v, where u represents the color of the lower image layer and v represents the color of the upper image layer. Other examples of such transfer modes include the minimum function T(u,v)=min(u, v), the maximum function T(u,v)=max(u,v), and "HSB" functions, i.e., functions which substitute one or two of the hue, saturation or brightness values to generate the new color. These functions correspond to the lighten, darken, hue, saturation, color, and luminosity blending modes.

If the accumulation buffers store alpha values, then the new color, new_primary_color, and the new opacity, new_primary_alpha, may be calculated as follows:

new_primary_alpha(x, y)=lerp(old_primary_alpha(x, y), secondary_alpha(x, y), compound_alpha(x, y)).

where old_primary_alpha represents the previous opacity of the temporary_alpha(x, y)=old_primary_alpha(x,y)/new_primary_alpha(x,y)

temporary_color(x,y)=lerp_color(secondary_color(x,y), oldprimary_color(x, y), temporary_alpha(x, y))

new_primary_color(x, y)=lerp_color(temporary_color(x, y), secondary_color(x, y), compound_alpha(x, y))

pixels in the primary accumulation buffer. It may be noted that the program performs a linear interpolation of the alpha component.

In the case where the accumulation buffers store the alpha value and the image layer has a transfer mode other than the normal blending mode, the exact treatment will depend on the nature of the compound layer transfer mode. However, for cases where old_primary_alpha will be equal to or less than secondary_alpha, the following calculations may be performed:

new_primary_alpha(x, y)=lerp(old_primary_alpha(x, y), secondary_alpha(x, y) compound_alpha(x, y))

temporary_alpha(x, y)=old_primary_alpha(x, y)/new_primary_alpha(x, y)

temporary_color(x, y)=lerp_color(secondary_color(x, y), old_primary_color(x, y), temporary_alpha(x, y))

blended_color(x, y)=compound_transfer_mode(temporary_color(x, y), secondary_color(x, y))

new_primary_color(x, y)=lerp_color(temporary_color(x, y), Blended_color(x, y), compound_alpha(x, y))

Returning to FIG. 10, once the secondary buffer and the primary buffer have been composited, the system returns to step 88 to determine whether there are any layers remaining in the document. Assuming that there are no more layers in the document, the composition process is complete, and the contents of the primary buffer may be rendered to display the final image.

The process readily supports arbitrary nesting. Each level of nesting introduces another temporary copy of the accumulation buffer. The invention may also be implemented by saving a copy of the accumulation buffer, compositing additional layers into the accumulation buffer and then applying a saved copy of the accumulation buffer into the primary accumulation buffer with an inverted mask.

Referring to FIG. 12, the method of the present invention may be implemented with a memory 124, such as conventional random access memory, and a processor 126, such as a conventional microprocessor. The memory and processor may be components of a general-purpose computer 122 of conventional construction in a computer system 120. The computer system 120 may also include a mass storage device 128, an output device 130, such as a display screen, laser printer print engine, photo typesetter, or laser film recorder, and an input-device 132, such as a keyboard or mouse. The microprocessor 126 is controlled by a graphical image manipulation program 80 stored in memory 124. The graphical image manipulation program 80 has access to the document 50. Alternately, the processor and memory may be embedded in a peripheral device.

The methods described may be implemented in hardware, firmware, software, or combinations thereof, or in a computer program product tangibly embodied in a computer readable storage device. Storage devices suitable for tangibly embodying the computer program include all forms of non-volatile memory, including semiconductor memory devices, magnetic disks, magneto-optical disks, and optical disks.

What is claimed is:

1. A method of compositing a set of ordered image layers, comprising:

defining a compound layer containing a plurality of image layers from the set of image layers, the compound layer having a compound layer effect;

compositing any image layers under the compound layer to generate a first intermediate image;

compositing the first intermediate image with each image layer in the compound layer to generate a second intermediate image;

compositing the first intermediate image with the second intermediate image according to the compound layer effect to generate a third intermediate image; and compositing the third intermediate image with any remaining image layers to generate a final image.

2. The method of claim 1, wherein the compound layer effect comprises positionally varying opacity information.

3. The method of claim 2, wherein the opacity information includes dynamic data.

4. The method of claim 2, wherein the opacity information is represented by a pixel array.

5. The method of claim 2, wherein the opacity information is represented analytically.

6. The method of claim 1, wherein the compound layer effect comprises a global opacity.

7. The method of claim 1, wherein the compound layer effect comprises a color blending effect.

8. The method of claim 7, wherein the color blending effect satisfies the property that T(c,c)=c, where T represents the transfer function of the color blending effect and c represents a color.

9. The method of claim 1, wherein compositing the stored first intermediate image with the second intermediate image comprises:

calculating any dynamic data in the composite layer;

calculating an opacity of the composite layer; and combining a color in the stored first intermediate image with a color in the second intermediate image to generate a composited color in the third intermediate image.

10. The method of claim 9, wherein compositing the stored first intermediate image with the second intermediate image further comprises combining an opacity in the first intermediate image with an opacity in the second intermediate image to generate a composited opacity in the third intermediate image.

11. The method of claim 1, wherein the compound layer comprises a first compound layer containing the plurality of image layers, and a second compound layer containing a subset of the plurality of image layers, the second compound layer including a second compound layer effect.

12. The method of claim 11, wherein compositing the first intermediate image with each image layer in the first compound layer comprises:

compositing any image layers in the first compound layer under the second compound layer to generate a fourth intermediate image;

compositing the fourth intermediate image with each image layer in the second compound layer to generate a fifth intermediate image;

compositing the fourth intermediate image with the fifth intermediate image according to the second compound layer effect to generate a sixth intermediate image; and compositing the sixth intermediate image with any remaining image layers in the first compound layer to generate the second intermediate image.

13. The method of claim 1, wherein compositing image layers outside the compound layer includes sequentially compositing image layers into a primary accumulation buffer.

14. The method of claim 13, wherein compositing the image layers in the compound layer includes sequentially compositing image layers into a secondary accumulation buffer.

15. The method of claim 14, wherein compositing the stored first intermediate image with the second intermediate image includes compositing the primary accumulation buffer with the secondary accumulation buffer.

16. The method of claim 14, wherein compositing the image layers into the first or second accumulation buffer comprises:

calculating dynamic data in the image layer;

calculating an opacity of the image layer; and combining a color in the image layer with a color in the accumulation buffer to generate a composite color in the accumulation buffer.

17. The method of claim 1, further comprising storing the first intermediate image.

18. A computer program, tangibly stored on a computer-readable medium, for compositing a set of ordered image layers, the computer program comprising instructions for causing a computer to:

define a compound layer containing a plurality of image layers from the set of image layers, the compound layer having a compound layer effect;

composite any image layers under the compound layer to generate a first intermediate image;

composite the first intermediate image with each image layer in the compound layer to generate a second intermediate image;

composite the first intermediate image with the second intermediate image according to the compound layer effect to generate a third intermediate image; and composite the third intermediate image with any remaining image layers to generate a final image.

* * * * *